US005521825A

United States Patent [19]

Unuvar et al.

[11] Patent Number: 5,521,825

[45] Date of Patent: May 28, 1996

[54] ENGINE INLET AIR VALVE POSITIONING

[75] Inventors: Lisa M. Unuvar, Flint; Daniel A. Crawford, Burton, both of Mich.

[73] Assignee: General Motors Corporation, Detroit, Mich.

[21] Appl. No.: 132,779

[22] Filed: Oct. 6, 1993

[51] Int. Cl.[6] .......... G06F 19/00; F02M 51/00

[52] U.S. Cl. .......... 364/431.05; 364/431.01; 123/480; 123/494; 123/399; 123/361; 123/339.1; 123/403; 73/118.2

[58] Field of Search .......... 364/431.01–431.12, 364/426.04, 424.1, 565; 123/399, 361, 493, 339, 338, 480, 486, 478, 341, 352, 489, 403, 694, 674, 417, 571, 672; 73/118.2, 119 A

[56] References Cited

U.S. PATENT DOCUMENTS

| | | | |
|---|---|---|---|
| 4,348,728 | 9/1982 | Sagisaka et al. | 364/431.05 |
| 4,365,299 | 12/1982 | Kondo et al. | 364/431.06 |
| 4,470,396 | 9/1984 | Hasumi et al. | 123/488 |
| 4,508,078 | 4/1985 | Takeuchi et al. | 123/403 |
| 4,597,049 | 6/1986 | Murakami | 364/431.07 |
| 4,711,218 | 12/1987 | Kabasin | 123/492 |
| 4,738,238 | 4/1988 | Ohishi | 364/431.05 |
| 4,765,296 | 8/1988 | Ishikawa et al. | 123/399 |
| 4,872,435 | 10/1989 | Ueyama et al. | 123/336 |
| 4,898,138 | 2/1990 | Nishimura et al. | 123/399 |
| 4,899,282 | 2/1990 | Holmes | 364/431.08 |
| 4,951,773 | 8/1990 | Poirier et al. | 180/197 |
| 5,019,799 | 5/1991 | Oshiage et al. | 340/438.9 |
| 5,033,431 | 7/1991 | Poirier et al. | 123/399 |
| 5,115,396 | 5/1992 | Keegan | 123/399 |
| 5,186,081 | 2/1993 | Richardson et al. | 364/431.01 |
| 5,270,935 | 12/1993 | Dudek et al. | 364/431.01 |
| 5,284,116 | 2/1994 | Richeson, Jr. | 364/432.12 |
| 5,293,553 | 3/1994 | Dudek et al. | 364/431.01 |
| 5,307,776 | 5/1994 | Unuvar et al. | 123/399 |
| 5,394,331 | 2/1995 | Dudek et al. | 364/431.01 |

FOREIGN PATENT DOCUMENTS

| | | |
|---|---|---|
| 3843056 | 7/1989 | Germany . |
| 63-025342 | 6/1988 | Japan . |
| 63219849 | 1/1989 | Japan . |
| 2154763 | 9/1985 | United Kingdom . |

*Primary Examiner*—Kevin J. Teska
*Assistant Examiner*—Jacques H. Louis-Jacques
*Attorney, Agent, or Firm*—Michael J. Bridges

[57] ABSTRACT

Dynamic adjustment of the impact of automotive vehicle accelerator pedal position on engine inlet air valve position in which a gain is varied in accord with vehicle speed and a limit varied in accord with vehicle speed, the gain being applied in a transfer function between sensed accelerator pedal position and desired inlet air valve position, and the limit being applied to the desired inlet air valve position, with the transfer function varying in accord with an operator selection from a set of transfer functions.

4 Claims, 4 Drawing Sheets

ENGINE INLET AIR VALVE POSITIONING

FIELD OF THE INVENTION

This invention relates to internal combustion engine electronic throttle control and, more specifically, to throttle scheduling in an electronic throttle control system.

BACKGROUND OF THE INVENTION

Electronic throttle control ETC has been applied to automotive vehicles in which an electrical actuator, driven by an electrical signal from a controller, positions an engine inlet air or throttle valve. When applied in an air-lead engine control system in which engine fueling is controlled in response to inlet air rate, ETC provides a platform on which a variety of control benefits become available.

In typical conventional ETC systems, an accelerator pedal position sensor communicates an operator commanded engine operating point to a controller. The controller in turn determines a desired throttle position and issues a digital command appropriate to drive the throttle valve position toward the desired throttle valve position in accord with an applied control function. The issued command is used to drive an actuator, such as a motor, which rotates with the throttle valve.

Accordingly, ETC provides a mapping between sensed accelerator pedal motion and desired throttle valve motion. Such mapping is known not to be fixed. For example, conventionally known inputs attributed to vehicle cruise control, idle speed control, traction control, and engine torque management may override such mapping temporarily, driving throttle valve position away from a position corresponding to sensed accelerator pedal position. Furthermore, as described in U.S. Pat. No. 4,597,049, the gain applied between accelerator pedal motion and throttle valve motion may be made variable for improved performance and controllability.

Further advantages in vehicle control, driveability, and performance are available through variable mapping than are provided for in the prior art. It may be desirable under certain driving conditions to limit throttle authority, or to redefine ETC control resolution. For example, it may be desirable at low vehicle speeds to restrict the maximum achievable throttle valve opening to constrain vehicle motion, improving vehicle controllability and smoothness at tip-in. Such constraints may become less attractive as vehicle speed increases. Furthermore, at low vehicle speeds, controllability of the vehicle may be improved by varying the mapping between accelerator pedal motion and throttle valve motion in a manner that requires an increased amount of pedal motion for a fixed amount of valve motion, improving control resolution so the vehicle operator may achieve precisely a desired throttle valve opening. At intermediate vehicle speeds, the high degree of control resolution may be relaxed slightly, so the operator need not impart a substantial amount of pedal motion to significantly move the throttle valve. Finally, at high vehicle speeds, vehicle response may be improved by a low degree of control resolution, wherein little pedal motion may result in significant throttle valve motion.

SUMMARY OF THE INVENTION

The present invention provides the advantages not available through the prior art systems by dynamically varying a mapping between accelerator pedal motion and throttle valve motion.

Specifically, a combination of a variable throttle valve opening limit and a variable pedal to throttle valve mapping gain is applied in a determination of a desired throttle valve position for a sensed accelerator pedal position. The throttle valve opening limit varies as a predetermined function of vehicle speed, so as to severely limit throttle valve opening at low vehicle speeds while gradually relaxing the limit as vehicle speed increases. The mapping gain likewise varies according to a predetermined function of vehicle speed. Such may provide low gain at low vehicle speeds for improved throttle valve control resolution with gradually increasing gain with vehicle speed to improve vehicle response and minimize driver effort.

In a further aspect of this invention, the variable gain and dynamic limit may be applied to an active one of a set of pedal to throttle valve schedules. Each of such schedules may define a unique relationship between the range of sensed accelerator pedal positions and the range of desired throttle valve positions. An individual schedule from the set may become active through manual selection by a vehicle operator.

BRIEF DESCRIPTION OF THE DRAWINGS

The invention may be best understood by reference to the following description of a preferred embodiment and to the drawings in which.

DESCRIPTION OF THE PREFERRED EMBODIMENT

Figure 1:
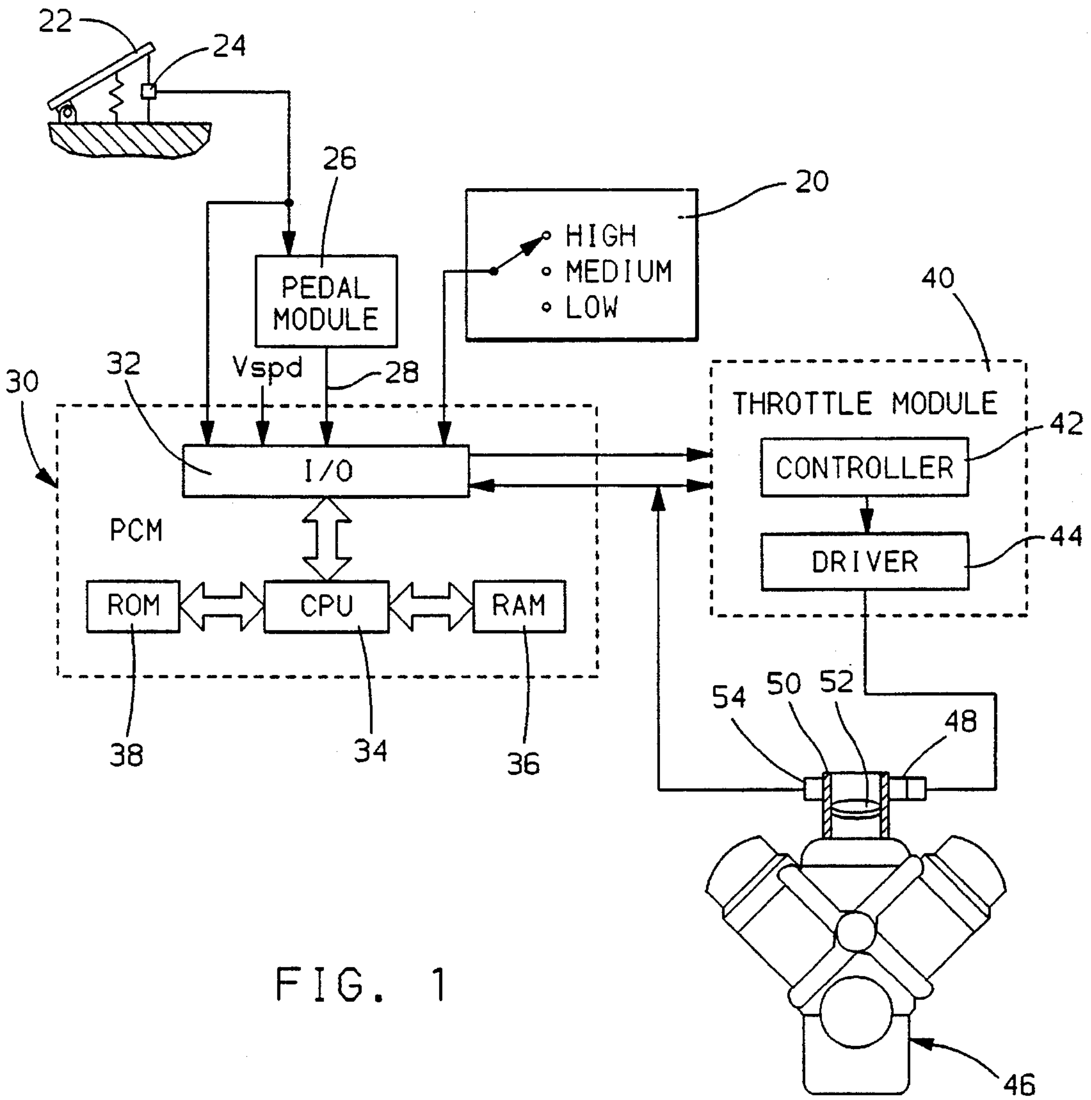
FIG. 1 is a general diagram of hardware components used to carry out this invention in accord with the preferred embodiment.

Referring to FIG. 1, the position of a vehicle accelerator pedal 22 is sensed by conventional pedal position sensor 24 or by a plurality of conventional pedal position sensors provided in a redundant configuration. The position is transduced into one or more signals the magnitude of which is proportional to displacement of the pedal 22 away from a rest position. The signals are communicated to pedal module 26 which may consist of a conventional single chip microcontroller that receives the signals and resolves therefrom a value PPS corresponding to the accelerator pedal displacement away from the rest position.

While the vehicle is operating, pedal module 26 periodically communicates accelerator pedal position PPS and brake pedal (not shown) position information to a powertrain control module PCM 30, via communication link 28, which may be a serial or parallel link. As illustrated in FIG. 1, a raw pedal position signal from position sensor 24 may be communicated as diagnostic information directly to the PCM 30.

PCM 30 receives and transmits information, such as information from link 28 or diagnostic information via an input/output unit IO 32. Included as input information to IO 32 is a signal Vspd, indicating a speed of motion of the vehicle in which the hardware of FIG. 1 is installed in this embodiment. Vspd may be provided from a conventional wheel speed sensor (not shown), or from a sensor providing a signal the period of which is proportional to the rotational velocity of a powertrain output shaft, such as the driveshaft (not shown), or in any manner of vehicle speed sensing generally known in the art.

The PCM 30 may consist of random access memory storage RAM 36, read only memory storage ROM 38, and a central processing unit CPU 34. Alternatively, the inventors intend that any conventional controller capable of providing generally known powertrain control functions, such as engine and transmission control and diagnostic functions, and emissions control and diagnostic functions may be used as the controller in accord with this embodiment.

A throttle module 40 is provided including a controller 42 and an actuator driver 44. An internal combustion engine 46 having an air intake bore 50 through which intake air flows as is needed in engine operation, includes a throttle valve 52, such as a conventional butterfly valve disposed in the bore 50 for regulating the quantity of air provided to an intake manifold (not shown) of the engine. An actuator 48, such as a conventional DC motor or other conventional rotary actuator, is associated with the throttle valve, such as through a geartrain, in such a manner that rotation of the actuator 48 varies the valve position so as to change the degree of opening of the valve 52, affecting the capacity of the bore 50 to pass air to the intake manifold, as is well-established in engine control.

The position of the valve 52, such as the rotary position of a conventional butterfly valve, is sensed by a conventional throttle position sensor 54, which communicates a transduced throttle position signal to throttle module 40. The signal may also be communicated to PCM 30, such as for diagnostic or control functions carried out in the PCM.

Figure 2:
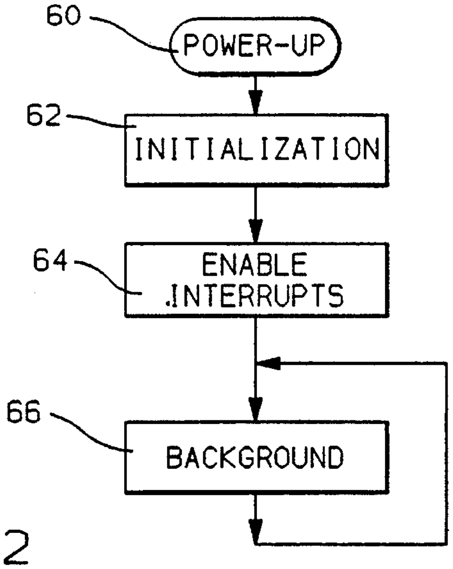
FIGS. 2, **3*a*, and 3*b* are computer flow diagrams illustrating the steps used to carry out this invention in accord with the preferred embodiment.
Figure 3A:
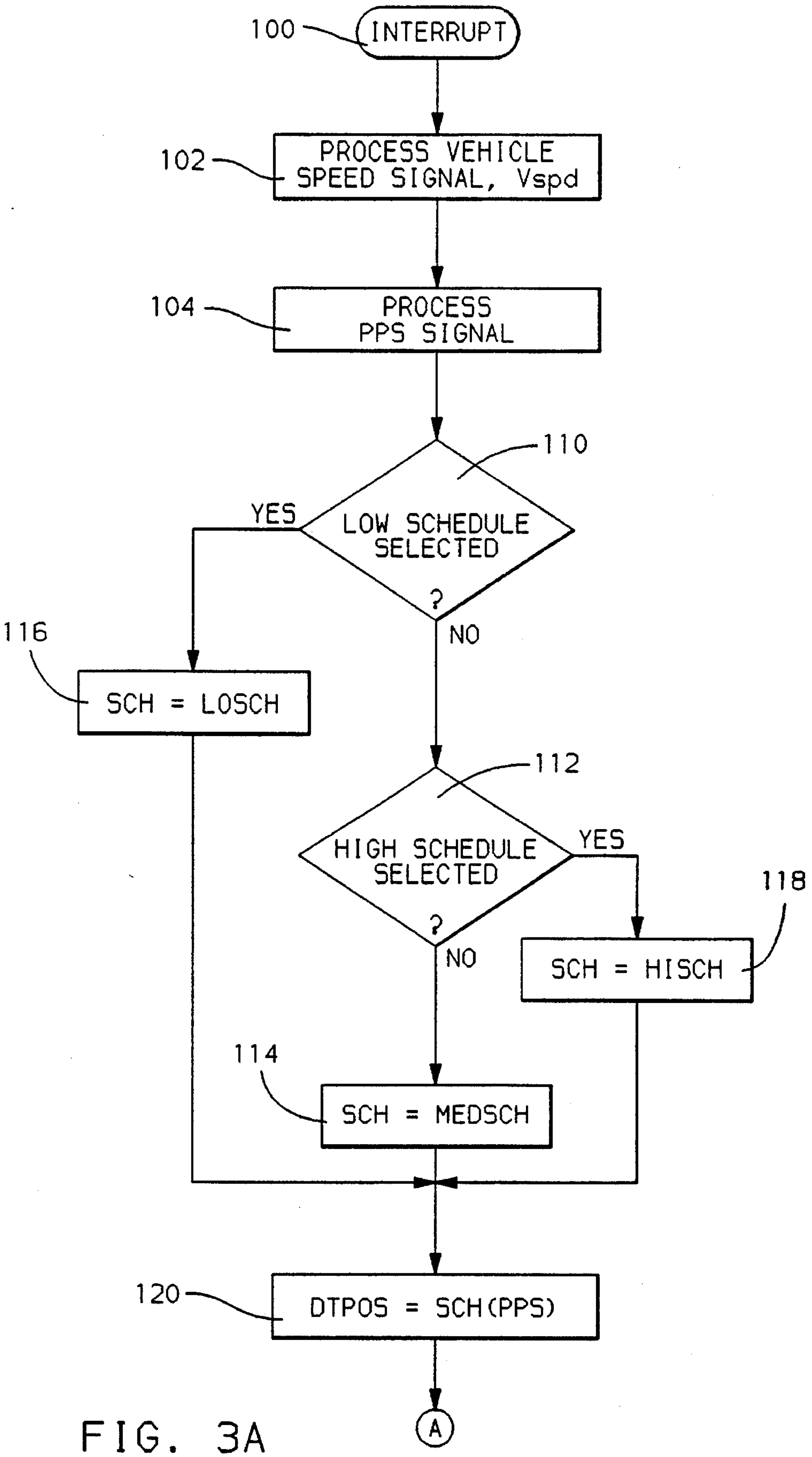
Figure 3B:
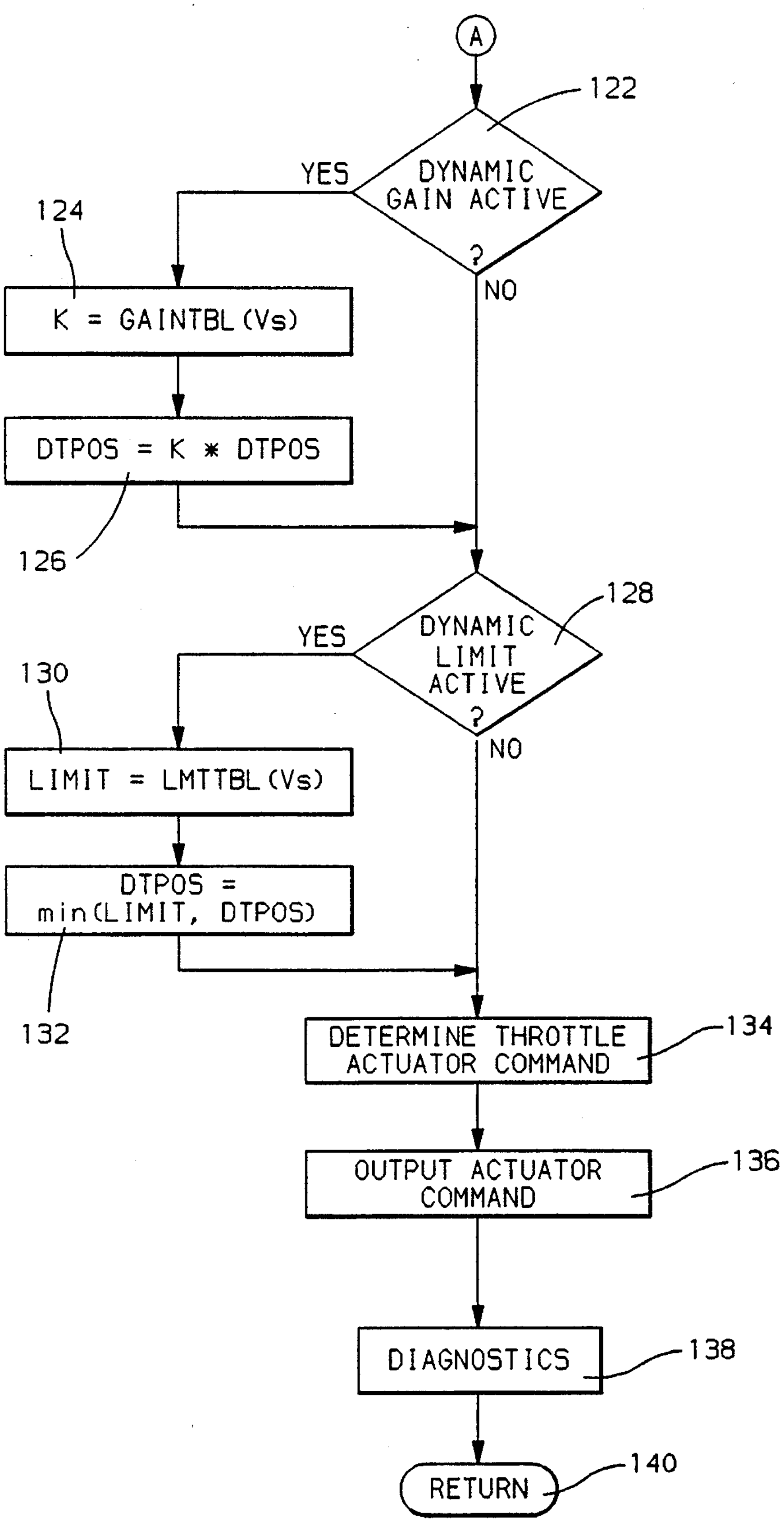

The controller 42 of throttle module 40 may use throttle position information provided from throttle position sensor 54 to determine any change in position that may be needed to drive the actual throttle valve position to a desired throttle position as will be provided in this embodiment by PCM 30 through execution of the steps illustrated in FIGS. 2, 3*a*, and 3*b*, to be described. Alternatively, either of the pedal module 26 or the throttle module 40 may carry out some or all of the steps of the present embodiment.

Any change in desired throttle position is translated into a required amount of actuator motion as is generally known in the art, and an appropriate motion command is provided to driver 44 which drives actuator 48 accordingly. The inventors intend that any conventional actuator 48 and driver 44 combination may be used to carry out such actuation in accord with the principles of this invention.

A switch 20 is provided, such as a manual three position switch, with which the vehicle operator may select one of at least three gain schedules in accord with this embodiment. The selection is made by positioning the switch so as to point to the desired schedule. Information on the switch setting or position is provided via a switch output line to IO 32 of PCM 30.

Figure 4:
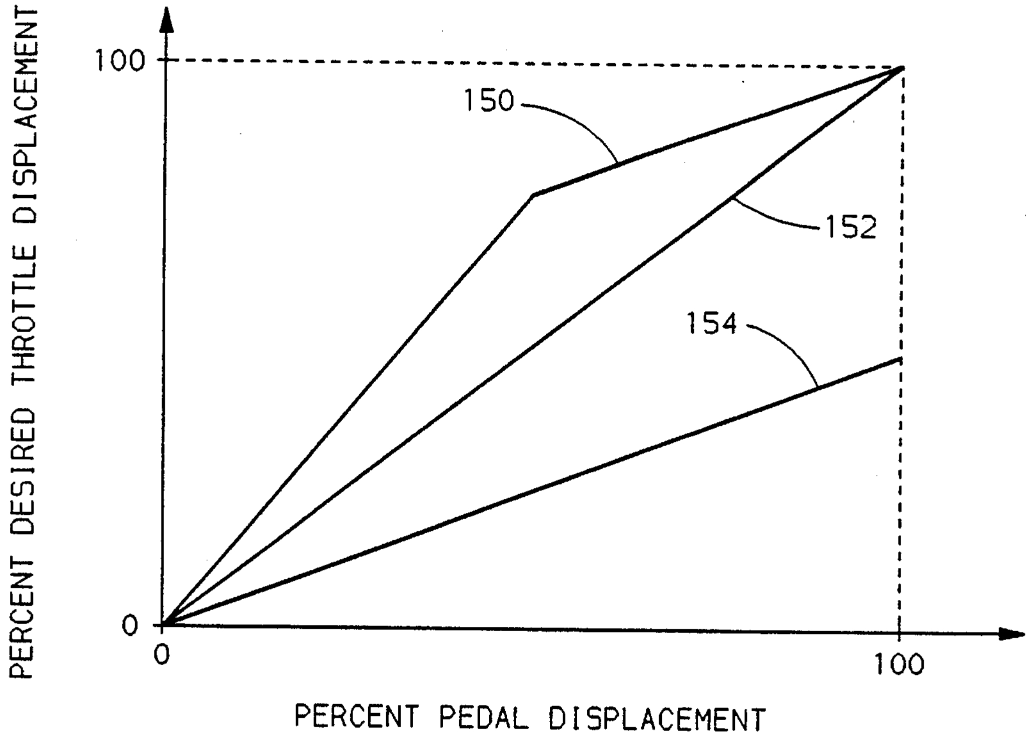
FIGS. 4–6** are diagrams illustrating relationships between parameters used in carrying out this invention in accord with the preferred embodiment.

The gain schedules include low, medium, and high gain schedules each of which characterize a relationship between a displacement of the accelerator pedal 22 away from a rest position and a desired throttle valve 52 displacement away from a position at which a minimum inlet air quantity is allowed by the valve. The gain schedules of this embodiment are illustrated in FIG. 4. The high gain schedule is shown as curve 150, the medium gain schedule is shown as curve 152, and the low gain schedule is shown as curve 154. The manner in which these schedules are applied in the present embodiment will be detailed in FIGS. 3*a* and 3*b*.

The specific steps used to carry out the principles of this invention in accord with a preferred embodiment and in the context of the preferred diagram of FIG. 1 are illustrated in FIGS. 2, 3*a*, and 3*b*, and are entered at step 60 of FIG. 2 when power is applied to the system, such as when the vehicle operator manually applies ignition power to the system.

These routines are stored in a well-known manner in system non-volatile memory, such as ROM 38 (FIG. 1) of the PCM 30, and are executed in a step-by-step manner by the CPU 34 of the PCM in accord with general practice in software execution. The inventors intend that these routines may alternatively be stored in non-volatile memory of the pedal module 26 or throttle module 40 (FIG. 1) and executed by a single chip microcontroller therein. Furthermore, any means of carrying out the steps illustrated in FIGS. 2, 3*a*, and 3*b* is suitable as an embodiment of the principles of this invention as contemplated by the inventors.

Specifically, when power is applied to the vehicle, the PCM executes the routine of FIG. 2, starting at a step 60, and then advancing to a step 62 to carry out any initialization that may be necessary in accord with customary startup procedures, such as the setting of initial values for pointers, counters, and flags, and by transferring data constants from ROM 38 to RAM 36.

Next, the routine moves to a step 64, to enable any conventional interrupts as may be needed by the PCM 30 (FIG. 1) to execute conventional powertrain control, such as timer interrupts to read conventional sensors and perform diagnostics, and event based interrupts to issue powertrain control commands. The routine then proceeds to a step 66 to carry out background operations that are continuously repeated while the PCM 30 is operating. The background operations may include general diagnostic and maintenance routines, and are interrupted upon the occurrence of certain control events, such as one of the above-enabled interrupts. Upon the occurrence of any of such interrupts, the CPU 34 will vector control to an appropriate interrupt service routine, such as may be set up in an interrupt vector map in ROM 38 (FIG. 1) and, upon completion of the service routine, the background routine will resume operation substantially where it left off.

One such interrupt routine is illustrated by FIGS. 3*a* and 3*b*, and is entered at a step 100 upon the occurrence of an appropriate periodic interrupt, such as a timer interrupt set up to occur approximately every sixteen milliseconds while the CPU 34 (FIG. 1) is operating. Among any other conventional operations that may be executed in a sixteen millisecond interrupt routine, the present FIGS. 3*a* and 3*b* describe those steps illustrating the scheduling operations of the preferred embodiment of this invention, wherein the accelerator pedal to throttle valve position schedule may be adjusted.

Specifically, the routine of FIGS. 3*a* and 3*b* starts at step 100 and moves to a step 102, to process the vehicle speed signal Vspd, such as by filtering or generally conditioning Vspd as necessary to provide a value Vs related thereto representing a usable form of the vehicle speed signal. The routine then moves to step 104, to process the PPS signal, the accelerator pedal position signal from pedal module 26. Such processing includes general filtering of PPS, so as to put PPS in a form useful for the scheduling of FIGS. 3*a* and 3*b*.

The routine then moves to a step 110, to determine if a low gain schedule, such as schedule indicated by curve 154 of FIG. 4, has been selected, such as manually by the vehicle operator positioning switch 20 (FIG. 1). If the low gain schedule is selected, the routine moves to a step 116, to set SCH to LOSCH, activating the function LOSCH describing the relationship between sensed accelerator pedal position and desired throttle valve position as indicated by curve 154 of FIG. 4. Such provides a low gain between sensed change in accelerator pedal position and desired change in throttle valve position. Low gain schedule LOSCH may be stored as a conventional lookup table in ROM 38 (FIG. 1).

For example, a series of desired throttle displacement values may be stored along with a corresponding set of percent pedal displacement values. A throttle displacement value is then retrieved from the table as the value corresponding to a most recent sensed accelerator pedal position. After setting SCH to LOSCH at step 116, the routine moves to a step 120, to be described.

If low gain schedule is not determined to be selected at step 110, the routine moves to a step 112, to determine if the switch 20 (FIG. 1) is currently pointing to the high gain schedule HISCH, indicating an operator selection of the high gain schedule. If the high gain schedule is selected at step 112, the routine moves to a step 118, to set SCH to HISCH, pointing to the high gain schedule such as indicated by piece-wise linear curve 150 of FIG. 4. Curve 150 describes a high gain relationship between percent pedal displacement and corresponding percent desired throttle valve displacement.

HISCH is a function stored in PCM memory, such as ROM 38 (FIG. 1) representing the relationship shown in curve 150. For example, a conventional table lookup may be used to represent HISCH, in which a series of lookup values of accelerator pedal position are matched with a corresponding series of reference values of desired throttle valve position, and desired throttle valve position values are retrieved from the table in the manner described for the table LOSCH. By setting SCH to HISCH at step 118, the high gain schedule is activated and will be the schedule used in the determination of a desired throttle valve position, as will be described.

After the operation of step 118, the routine moves to a step 120, to be described. However, if, at step 112, the high gain schedule is not selected by the position of switch 20 (FIG. 1), the routine moves to a default step 114, at which SCH is set to the medium gain schedule MEDSCH, which is assumed to be selected at the step 114. Curve 152 of FIG. 4 illustrates a medium gain schedule for the present embodiment. As described for LOSCH and HISCH, the gain schedule MEDSCH may be represented by a conventional table lookup in ROM 38 (FIG. 1) from which desired throttle valve position values are referenced as the value corresponding to a lookup accelerator pedal position value. By setting SCH to MEDSCH, the medium gain schedule is activated and will be used as the active lookup table.

Having activated the desired gain schedule at one of the steps 114, 116, or 118, the routine moves to step 120, to reference the desired throttle valve position DTPOS from the activated schedule as a function of accelerator pedal position, such as PPS. The routine then moves to steps 122–126 at which a dynamic gain K may be applied to DTPOS in accord with this invention. The dynamic gain K provides an adjustment of the relationship between sensed pedal position PPS and desired throttle position DTPOS in accord with certain driving conditions. The driving conditions are selected as those having a range over which vehicle controllability, performance, and smoothness can vary considerably. Vehicle speed is determined in this embodiment as such a driving condition.

The gain K is selected, such as through a conventional vehicle calibration, as a gain which contributes to a desired level of control, performance, and overall throttle control smoothness. For example, as illustrated by curve 160 of FIG. 5 in which gain K varies as a function of vehicle speed, the gain K is small, such as Kmin at lower vehicle speeds, such as speeds at or below Smin. This allows a high resolution control of throttle valve position, wherein the vehicle operator may easily position the throttle valve in a position consistent with a desired vehicle operating point, and wherein controllability and smoothness are improved as a stable, constant engine operating point is more easily maintained despite minor fluctuations in pedal position.

Figure 5:
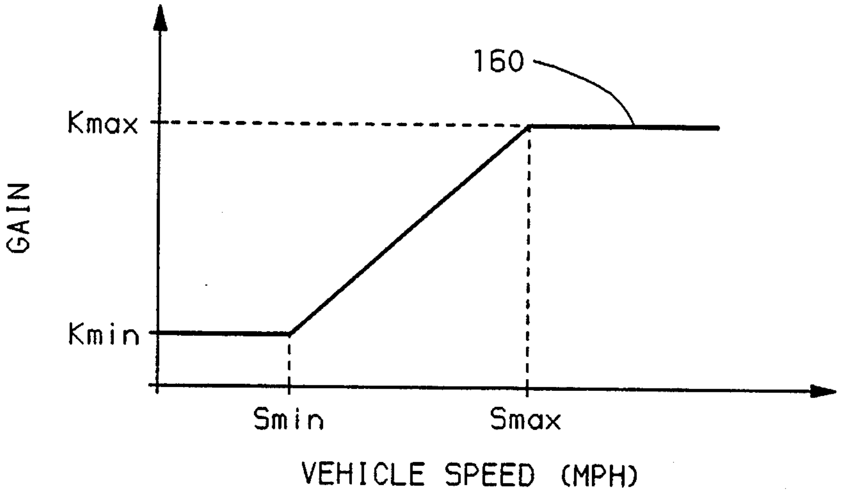

As vehicle speed increases, such as between Smin and Smax in FIG. 5, the gain K is gradually increased to satisfy an increased need for a responsive driving "feel." Finally, at high vehicle speeds, such as speeds at or above Smax in FIG. 5, control resolution and smoothness become less critical and response becomes more critical, and the gain K is increased and maintained at its maximum value Kmax.

Returning to FIG. 3*b*, the described gain is not applied unless active. The gain may be active through manual operator selection of an active gain mode of operation, such as by setting s switch (not shown) to an active setting. Alternatively, the gain may be active only under certain driving conditions, such as when the medium gain schedule is made active at step 114. If the dynamic gain is not determined to be active at step 122, the routine moves directly to step 128, to be described.

Otherwise, if the dynamic gain is active at step 122, the routine moves to step 124 to reference a gain K corresponding to the present vehicle speed Vs, according to a gain table GAINTBL, for example as illustrated in FIG. 5, such as may be stored in the form of a conventional lookup table in ROM 38 (FIG. 1), from which values for K are referenced as corresponding to Vs.

For example, the lower-bound gain Kmin of FIG. 5 may correspond to unity DTPOS gain, the upperbound gain Kmax of FIG. 5 to a maximum DTPOS gain, and gains between the upper and lower bounds may be determined through application of well-known linear interpolation techniques using the upper and lower bounds of both the gain and vehicle speed. After referencing K at step 124, the routine moves to a step 126, to apply K in an adjustment of the desired throttle position DTPOS in accord with the principles of this invention, as follows

DTPOS=K * DTPOS.

Next, the routine moves to steps 128–132, to provide desired throttle position limiting, if necessary. When active, a limit value LIMIT constrains DTPOS, so as to reduce vehicle lurching or downshifting, or to provide a limited performance mode of operation consistent with operator or owner preference. Specifically, the limiting function is provided by first executing a step 128 at which a check is made to determine whether the dynamic limit is active. The dynamic limit may be active through a manual operator or owner setting of a dedicated switch (not shown), wherein the switch is set to an active position when limiting is desired. Alternatively, the dynamic limit may be activated under predetermined vehicle operating conditions or may be activated when certain gain schedules are active, such as the medium gain schedule is activated at step 114.

Figure 6:
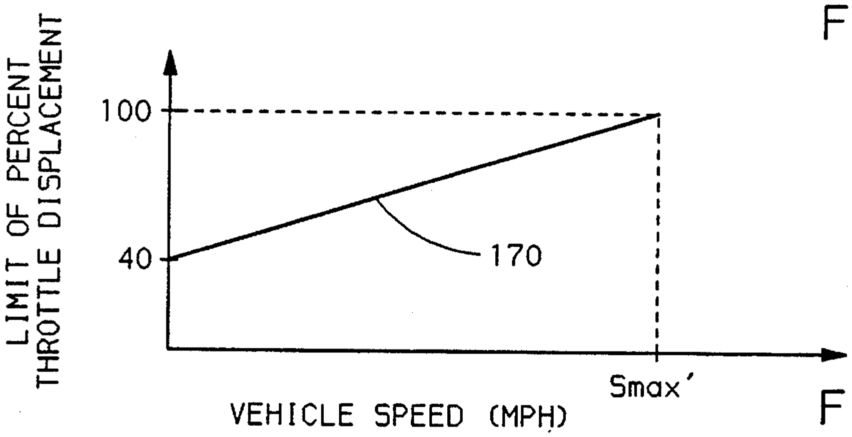

Returning to step 128, if the dynamic limit is determined not to be active, the routine moves directly to step 134, to be described. Otherwise, if the dynamic limit is active, the routine moves to step 130, to reference a limit value LIMIT as a function of vehicle speed Vs, via the function LMTTBL, one embodiment of which is illustrated as curve 170 in FIG. 6. As illustrated in curve 170 of FIG. 6, for a minimum vehicle speed, the DTPOS limit is approximately 40 percent of the maximum throttle range. As vehicle speed increases from the minimum speed, the limit gradually increases up to an unlimited DTPOS at a maximum vehicle speed Smax'.

LMTTBL may be stored as a conventional lookup table in ROM 38 (FIG. 1) and values for LIMIT referenced therefrom as the limit values corresponding to the lookup value Vs, such as in the manner described for the gain schedule lookup tables.

After referencing a value for LIMIT at step 130, the routine move to step 132 to limit desired throttle position DTPOS in accord with the limit, as follows DTPOS=min(LIMIT, DTPOS)

in which the function min( ) generates as its output the minimum value in its input class which, in this embodiment, is the minimum from the class including LIMIT and DTPOS.

After limiting DTPOS to the lesser of DTPOS and LIMIT at step 132, or if such limiting was not active at step 128, the routine moves to a step 134, to determine a throttle actuator command in accord with conventional electronic throttle control ETC practice as the command necessary to drive the present throttle position as sensed by throttle position sensor 54 toward DTPOS as determined through the described steps of FIGS. **3*a* and 3*b*. Next, the throttle actuator command is output at a step 136 to the throttle module 40 (FIG. 1) so as to be applied to the driver 44 for application to the actuator 48** in accord with conventional knowledge in the ETC art.

Alternatively, the step 134 may be carried out through operations in throttle module 40, in which case PCM 30 would simply output DTPOS to throttle module at the step 134, and step 136 would not be executed. After the command is output at step 136, the routine moves to a step 138 to carry out any conventional diagnostics desired to be executed at the iteration rate of the present routine, such as every sixteen milliseconds. Such diagnostics may include powertrain control diagnostics, or ETC diagnostics, as may be applied to the system of this embodiment through ordinary skill in the electronic throttle control art.

After carrying out any diagnostics that may be included at step 138, the routine moves to a step 140, at which control is returned to the background operations represented by step 66 of FIG. 2. The background operations will then resume substantially at the point at which they were interrupted by the interrupt serviced by the routine of FIGS. **3*a* and 3*b*. As described, a subsequent interrupt, such as the sixteen millisecond time-based interrupt serviced by the routine of FIGS. 3*a* and 3*b*, will subsequently interrupt the background operations to carry out the associated interrupt service routine, such as the routine of FIGS. 3*a* and 3*b***.

The preferred embodiment for the purpose of explaining the invention is not to be taken as limiting or restricting the invention since many modifications may be made through the exercise of skill in the art without departing from the scope of the invention.

The embodiments of the invention in which a property or privilege is claimed are described as follows:

1. A method for determining a desired position of an inlet air valve in an internal combustion engine of an automotive vehicle, comprising the steps of:

sensing a first predetermined operating parameter;

sensing a second predetermined operating parameter;

sensing an input command indicative of a commanded engine operating point;

selecting an active schedule from a predetermined set of schedules wherein each of the set of schedules describes a relationship between a range of input commands and a range of desired inlet air valve positions:

determining a desired inlet air valve position as the inlet air valve position corresponding to the sensed input command according to the active schedule;

selecting a position gain value as a predetermined function of the sensed first predetermined operating parameter;

applying the position gain value to the desired inlet air valve position;

selecting a position limit as a predetermined function of the sensed second predetermined operating parameter; and limiting the desired inlet air valve position to the selected position limit.

2. A method for controlling a degree of opening of an inlet air valve of an internal combustion engine provided on an automotive vehicle, comprising the steps of:

sensing vehicle speed;

sensing a command value indicative of a commanded engine operating point;

referencing a desired degree of opening of the inlet air valve as a predetermined function of the sensed command value;

determining when a dynamic inlet air valve gain is active;

adjusting the referenced desired degree of opening of the inlet air valve when the dynamic inlet air valve gain is determined to be active, by (a) selecting a preferred gain as a predetermined function of sensed vehicle speed, and (b) applying the preferred gain to the referenced desired degree of opening of the inlet air valve;

determining when a dynamic inlet air valve limit is active;

limiting the referenced desired degree of opening of the inlet air valve when the dynamic inlet air valve limit is active, by (a) selecting a preferred limit as a predetermined function of vehicle speed, and (b) limiting the referenced desired degree of opening of the inlet air valve to the preferred limit; and controlling the opening of the inlet air valve in accord with the referenced desired degree of opening.

3. The method of claim 2, further comprising the steps of:

sensing a predetermined input signal; and selecting an active schedule from a predetermined set of schedules in accord with the sensed input signal wherein each of the set of schedules defines a predetermined relationship between a range of sensed command values and a range of desired degrees of opening of the inlet air valve; and wherein the referencing step references a desired degree of opening of the inlet air valve as the degree of opening of the inlet air valve that corresponds to the sensed command value in the active schedule.

4. The method of claim 3, wherein the predetermined input signal indicates a manually selected active schedule.

* * * * *